Sept. 12, 1967   J. DICHTER   3,340,990
GLASS TUBE FEEDING DEVICES
Filed Feb. 11, 1966   3 Sheets-Sheet 1
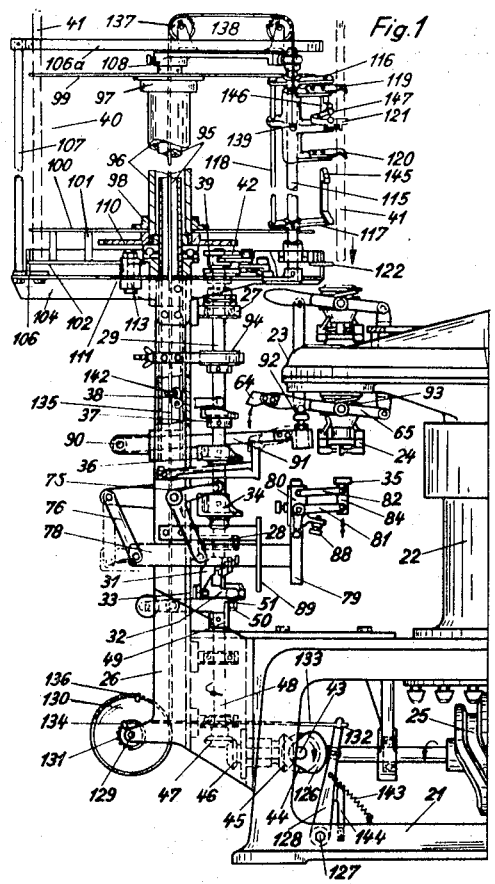
Fig.1
Fig.2
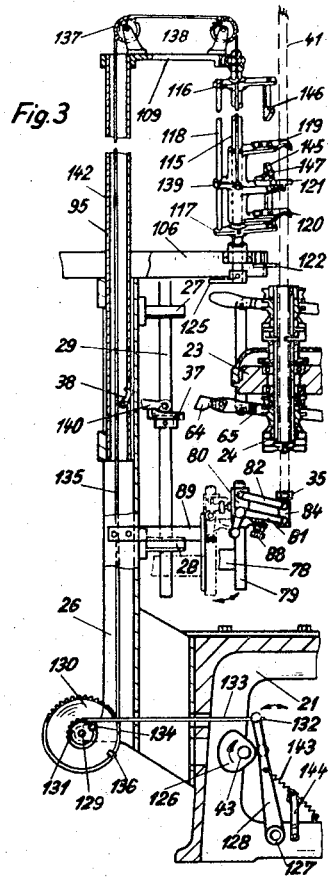
Fig.3
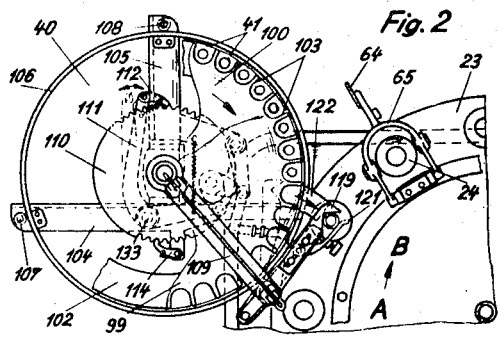
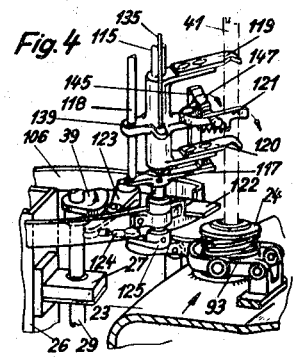
Fig.4
Inventor:
JAKOB DICHTER
By Smythe & Moore
ATTORNEYS Sept. 12, 1967  J. DICHTER  3,340,990
GLASS TUBE FEEDING DEVICES
Filed Feb. 11, 1966  3 Sheets-Sheet 2
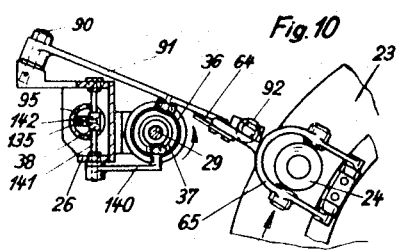
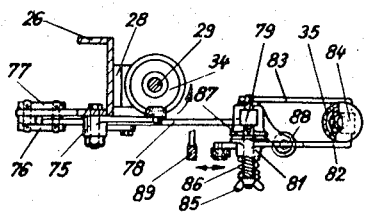
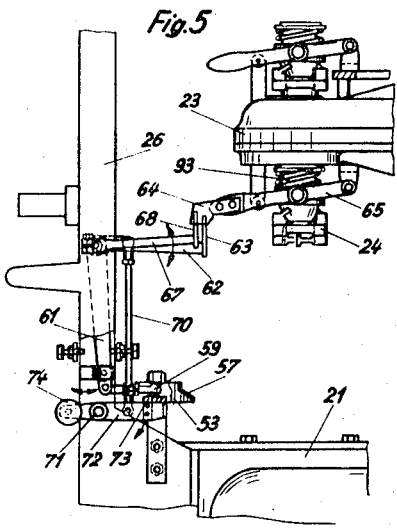
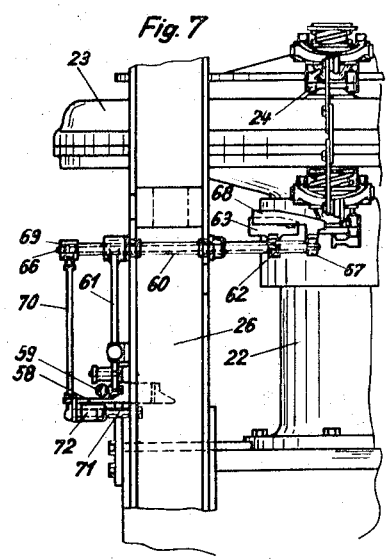
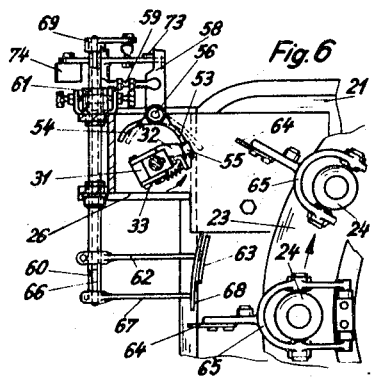
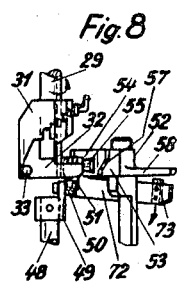
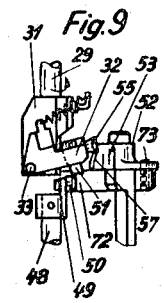
Inventor:
Jakob Dichter
By Smythe & Moore
ATTORNEYS Sept. 12, 1967 J. DICHTER 3,340,990
GLASS TUBE FEEDING DEVICES
Filed Feb. 11, 1966 3 Sheets-Sheet 3
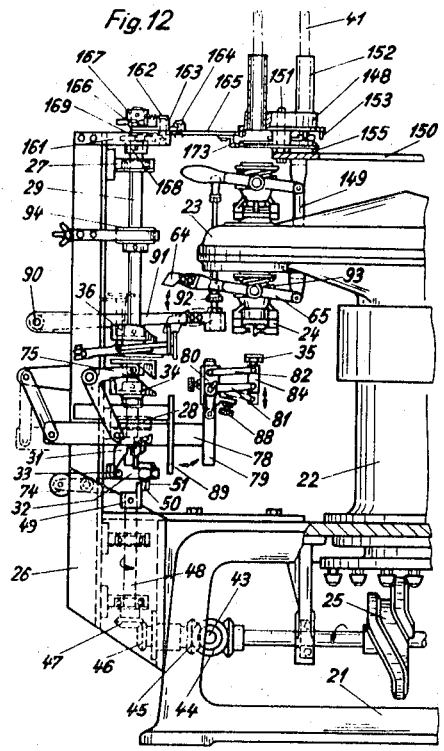
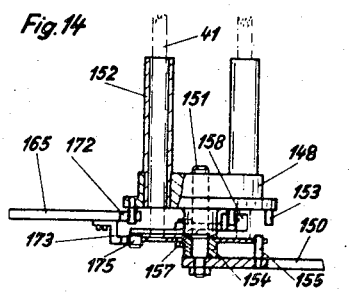
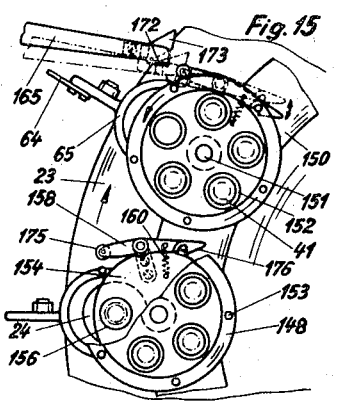
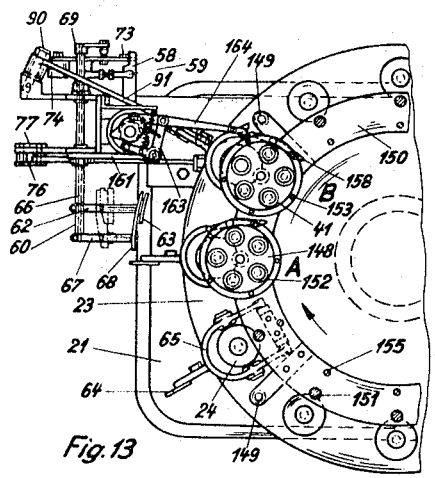
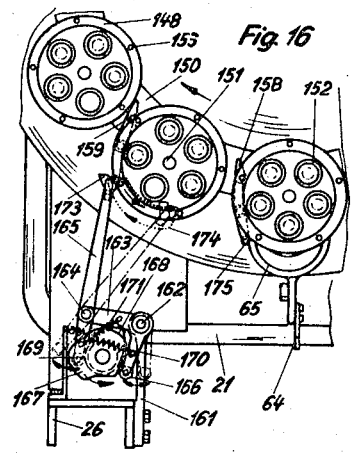
Inventor:
JAKOB DICHTER
By Smythe & Moore
ATTORNEYS United States Patent Office 3,340,990
Patented Sept. 12, 1967

3,340,990
GLASS TUBE FEEDING DEVICES
Jakob Dichter, Sachsendamm 93, Berlin-Schoenberg 62,
Berlin, Germany
Filed Feb. 11, 1966, Ser. No. 526,841
Claims priority, application Germany, Feb. 12, 1965,
D 46,686
28 Claims. (Cl. 198—20)

This invention relates to devices for feeding glass tubes to the chucks of glass working machines and comprising at least one storage magazine and several working stations, the glass workpiece moving step by step from one working station to the next.

Previously known devices for feeding glass tubes or the like to the chucks of glass working machines, have control systems which are comparatively awkwardly arranged in that the individual control devices are largely decentralized, said control devices serving to advance the storage magazine, to introduce the glass tubes into the chucks and to position the tubes into their required working positions. The object of the present invention is to provide an improved control system which allows as far as possible all the operations involved in the feeding of the workpieces to the glass working machine to be initiated by a single control device, which serves all these several operations in common. In accomplishing this task particular care has been taken to find a solution which is applicable on the one hand to glass working machines equipped with several storage magazines serving the individual working chucks, while at the same time still leaving open as an alternative the further possibility, according to a further aspect of the invention, of serving machines which have only a single, stationary storage magazine. In developing this device an attempt has also been made to arrange it for construction largely using standardized parts, and furthermore the intention has been to arrange this feeding mechanism in such a way that it can be installed on machines which have hitherto not been equipped with any storage magazine at all.

The object described above, has been achieved by the invention in that there is used for controlling the operations involved in feeding a fresh glass tube to the working chuck a control shaft on which are mounted a number of cams, this control shaft operated by a drive shaft through a coupling which is controlled by a mechanism which responds as soon as an empty chuck reaches the filling station, that is to say the place where the chuck is ready to receive a fresh glass tube.

The device according to the invention for feeding glass tubes or the like to the glass working machine is so arranged that control is largely centralized. Moreover the device according to the invention is very compact and can easily be installed on suitable glass working machines, as will be derived from the drawings, which represent a preferred version of the invention.

Particularly advantageous arrangements of the device according to the invention will now be described with reference to the accompanying drawings, in which:

FIG. 1 is a side view of the device according to the invention;

FIG. 2 is a plan view of part of the device of FIG. 1;

FIG. 3 is a side view of the device in FIG. 1 which grips the glass tube during its introduction;

FIG. 4 shows a detail of the device according to FIG. 3;

FIGS. 5 to 7 show the switching mechanism and the catch for operating the coupling;

FIG. 8 shows the switching coupling in the engaged position;

FIG. 9 shows the switching coupling in the disengaged position;

FIG. 10 shows the opener for the chuck which takes the glass tube, and the catch for the stroking movement of the chuck assembly, in plan view;

FIG. 11 shows the mechanical stop for the glass tube, and the friction brake, whereby the mechanical stop can be moved into and out of its operative position;

FIG. 12 is a side view showing a different version of the invention;

FIG. 13 is a plan view showing the device of FIG.12;

FIG. 14 is a storage magazine of the device of FIG. 12, showing the catch, in side view;

FIG. 15 is a plan view showing two storage magazines;

FIG. 16 is a plan view showing several storage magazines, with the switching mechanism.

In FIGS. 1, 2, 3 there is mounted on the machine base 21 at the upper end of the middle spindle 22 the rotary carrier 23 and distributed at equal intervals around this there are the chucks 24, which are advanced at regular intervals by the engagement drive 25, which is of the well known kind. Mounted on one side of the machine base 21 and flanged thereto is the stand 26. Mounted on this stand at 27 and 28 there is the central control shaft 29, and on this there are mounted, in sequence beginning from the bottom, the half-coupling 30, which consists substantially of a block 31 and a stirrup 32, and which serves for engaging and disengaging the rotational drive for the shaft, and on this shaft there are further cam 36 for opening and closing the chuck 24, and cam 37 for controlling a catch 38. Near the upper end of the control shaft 29 there is mounted cam 39 for advancing storage magazine 40, whereby a long glass tube 41 is brought into the ready position. The introduction of the glass tube into the chuck 24 is controlled by cam 42. Inside the machine frame 21 there is drive shaft 43 which continuously rotates drive shaft 48 through pairs of bevel wheels 44, 45 and 46, 47. The coupling shown in FIGS.1, 6, 8 and 9 consists of driver 49 which is attached to the upper end of drive shaft 48, and driver roller 50, together with the block 31 attached to the control shaft 29, the stirrup 32 being mounted to pivot in the block 31 about the point 33.

To the stirrup 32 there is atached driver 51 into which engages driver roller 50, attached to the rotary shaft 48, in such fashion that when the stirrup 32 is in the horizontal position as shown in FIG. 8 the driver roller 50 rotates the control shaft 29. This driving action takes place when, as shown in FIG. 6, the control stirrup 52 is in the position shown in broken lines. In these circumstances control roller 55, which is attached to the stirrup 32, passes along clear of free end 53 during the first part of the rotation of the shaft 29, but with further rotation makes contact with arm 54 and rotates this about its pivot point 56 back into the position shown in full lines.

With further rotation of the control shaft 29 control roller 55 runs upwards along curved track 57 of the arm 53, whereby the stirrup 32 is lifted (FIG. 9). As a result the driver 51 is disengaged from the roller 50. The control shaft 29 comes to a stop, and the drive shaft 48 continues to rotate all by itself.

The control stirrup 52 is actuated by articulated rod 59, which engages with stirrup arm 58, this movement transmitted by lever 61 which is attached to quill shaft 60. The quill 60 is mounted on stand 26.

To the quill 60 is attached lever 62 with its rail 63, which is situated in the path of movement of plate 64, the latter being attached to opening lever 65 of chuck 24. In order to reduce friction the plate 64 can be replaced by a roller.

When the chuck 24 is switched across from the position A into the position B and contains a glass tube, the opening lever 65 is in the raised position relative to the rail 63, with the result that the plate 64 moves over the rail 63 without touching it (compare FIGS. 5, 6, 7). In these circumstances the stirrup 52 (FIGS. 6 and 9) is in the position shown in full lines, and it remains in this position until shifted over into the position shown in broken lines. Let us assume that the chuck 24 is at the station A and contains no tube. The opening lever 65 with the plate 64 is in the lowest position (FIG. 5). The chuck 24 now moves from the position A into the position B, so that the lever 62 with its rails 63 is pushed downwards and as a result the movement transmitted through the quill shaft 60, the lever 61, the articulated rod 59 and the stirrup arm 58 pivots the stirrup 52 about the point 56 into the position shown in broken lines, with the result that the stirrup 32 with its roller 55 now falls down into the horizontal position (FIG. 8). In these circumstances the driver roller 50 on the driver 49, which is mounted on the continuously rotating shaft 48, engages with the driver 51 and rotates the shaft 29 through 360°. The limitation of this to one single rotation is obtained by the fact that the roller 55, just after passing the pivot point 56, pushes the arm 54 sideways and thus rotates the stirrup 52 away from the position shown in broken lines and back into the position shown in full lines, with the result that further rotation of the control shaft 29 causes the roller to ride up along the cam surface 57 of the arm 53 and thus lifts the lever 62 and with it the rail 63 into its upper position (FIG. 9).

Inside the quill shaft 60 (FIG. 6) there is mounted shaft 66, and on the end of this there is mounted lever 67, which also carries a rail 68 whose edge runs sloping upwards. This cam rail 68 is connected through the lever 67, the shaft 66, lever 69 and rod 70 to double-ended lever 72, which pivots at 71. At the right-hand end of this double-ended lever 72 there is a nose 73, in the form of a catch, which is in contact with the arm 58 of the stirrup 52, this arrangement preventing inadvertent disengagement of the stirrup 52, (FIGS. 4, 6 and 7). The result is that the stirrup 32 with its driver 51 always remain disengaged (FIG. 9) as long as there is a glass tube in the chuck 24.

On the other end of the double-ended lever 72 there is a weight 74. The cam rail 68 is situated next to the rail 63. The rail 68 is longer than the rail 63 but runs along close to the rail 63 at its other end (FIGS. 6 and 7). What is achieved in this way is that when an empty chuck 24 moves along from position A to position B, actuated by the plate 64 on opening lever 65, the catch is at first opened and held open but subsequently, when the plate 64 has pushed down the cam rail 63, the coupling engagemet described above is initiated. After that, when the plate 64 has again released the two rails 63 and 68, the weight 74 returns the rail 68 to its initial position.

In FIG. 1 it will be seen that on the control shaft 29 there is further mounted a cam 34 which actuates the mechanical stop 35 through angle lever 75, links 76 and 77 and support bar 78, whereby the mechanical stop 35 is moved into and out of its operative position. On the end of the support bar 78 there is mounted vertical guide 79 and on this is mounted support 80 for the mechanical stop, this support 80 is adjustable in height by sliding up and down on the vertical guide 79. On the support 80 are mounted angle lever 81 and links 82 and 83, which carry support 84 in a ball bearing permitting the mechanical stop 35 to rotate. The top surface of the mechanical stop 35 is covered with a disc of asbestos or of some other fire-resistant material.

It will be observed that the support 84 for the mechanical stop 35 moves up and down almost vertically, due to the parallel linkage system provided by the angle lever 81 and the links 82, 83 (see FIGS. 1, 3 and 11).

FIG. 11 shows how the movement of the support 84 for the mechanical stop 35 is restrained by a friction brake disc 87, whereby the braking action of this disc is adjustable to suit the weight of the glass tube, the adjustment effected by means of wing nut 85 and coil spring 86. When the glas tube 41 makes contact with the mechanical stop 35, the latter moves downwards until the angle lever 81 comes to rest upon adjustment screw 88. When the support bar 78 moves backwards, the second arm of the angle lever makes contact with fixed mechanical stop 89, and this causes the mechanical stop 35 to move up again into its upper position (FIG. 3).

Mounted above the cam 36 and pivoting about point 90 there is mounted lever 91 and on the righthand end of this there is mechanical stop 92, which is adjustable and can be swung away to one side. The mechanical stop 92 engages the opening lever 65 and in this way opens the chuck 24, holds it open and closes it.

Spring 93 of the chuck, acting in conjunction with the descending curve of the cam 36, tends to accelerate the rotation of the control shaft 29. In order to restrain this acceleration, there is an adjustable brake 94 (FIGS. 1 and 10), which prevents the chuck 24 from closing too rapidly.

Mounted on the stand 26 there is the hollow, stationary inner shaft 95 and outside this there is hollow, rotating outer shaft 96, which has two end flanges 97 and 98, on which are mounted rotating discs 99 and 100. To the lower disc 100 are attached distance piece 101 and rotating ring 102. Distributed evenly around the peripheries of the rotating discs 99 and 100 are cut-out notches 103.

These U-shaped gaps 103 accommodate the long glass tubes 41 and carry them around in the advancing movement. In the operation of the machine, the glass tubes 41 are fed by hand into the storage magazine 40, where they stand with their lower ends supported by ring 102. To prevent the glass tubes from falling out sideways they are retained at their lower ends by stationary ring 106, which is supported by two arms 104 and 105, and at their upper ends by stationary ring 106a, which is supported by two arms 107 and 108 and by the stationary arm 109 (FIGS. 1 and 2).

To the lower end of the hollow rotating shaft 96 there is attached switch wheel 110 which has teeth around its periphery, corresponding in number to the notches 103 in the rotating discs 99 and 100. Under the switching wheel 110 is switching lever 111. On the two ends of this switching lever 111 are mounted two pivoted pawls 112 and 114, which engage with the teeth of the switching wheel 110. The switching section is as follows. The cam 42 mounted on the upper end of the control shaft 29 actuates the switching lever 111, which pivots around the bearing 113.

With this movement of the switching lever 111 pawl 112 engages with a tooth of the switching wheel 110 and advances the latter. Pawl 114, mounted on the other end of the switching lever 111, acts as a locking pawl for the switching wheel 110 (FIG. 2).

Shaft 115 is mounted pivotably at one end in the stationary ring 106 and at the other end in the stationary arm 109. Mounted at the upper and lower ends of this pivoted shaft 115 are levers 116 and 117, connected together by guide rod 118. Also mounted on this pivoted shaft 115 there is a clamp assembly comprising the levers 119 and 120 and movable clamp lever 121, whereby the glass tube 41 is held, during the advancing movement, clamped between these three parts.

In the feeding movement for feeding a glass tube into the chuck 24, the glass tube 41 is taken out of the notch 103 and, sliding over the surface of supporting plate 122, is swung out by the clamp assembly, by the pivoting movement of the shaft 115, till it is over the opening of the chuck 24, which has in the meantime been opened by the lever 91.

In this pivoting movement the clamp assembly is actuated by the cam 39, which is mounted near the top of the control shaft 29, the movement transmitted through the lever 123, rod 124 and lever 125.

The two levers 119 and 120, of the clamping device 119, 120, 121, are adjustable to suit the diameter of the glass tube 41.

The clamping lever 121 is itself slightly springy and is moreover also adjustable to suit the diameter of the glass tube, to the effect that at the beginning of the return movement of the clamp assembly, after the glass tube has been introduced into the chuck 24, the lever 121 can slip off the glass tube. To introduce the glass tube 41 into the chuck 24 the clamp assembly moves downwards under the action of gravity, sliding down over the shaft 115 and over the guide rod 118, until the lower end of the glass tube comes to rest on the surface of the mechanical stop 35. FIGS. 1, 2 and 4 show the glass tube is held during this feeding movement, and how the clamp assembly is guided in its up and down movement.

Mounted on the constantly rotating drive shaft 43 of the machine there is cam 126 which moves lever 128 about pivot bearing 127. On the side of the stand 26 there is mounted in bearings shaft 129, on which is mounted a large chain sprocket wheel 130 to which is fixed a small chain sprocket wheel 131.

Chain 133 is attached at one end to the lever 128 at point 132, and at the other end to the sprocket wheel 131 at point 134, in such fashion that movement of the lever 128 causes rotation of the sprocket wheel 131. On the other hand, chain 135 is attached to the sprocket wheel 130 at point 136, this chain 135 passing through the hollow upright member 95 and from there over guiding wheels 137 and 138, which are mounted on the supporting arm 109, and attached at 139 to the clamp assembly (FIGS. 1, 2, 3 and 4).

On the chain 135 there is a collar 142 which is engaged by the pawl 38, which is actuated by the cam 37 through lever 140 and shaft 141. When the pawl 38 releases collar 142, the chain 135 is released (FIG. 10) and the clamp assembly moves downwards under the influence of gravity and under the control of the cam 126, until the glass tube 41 comes to rest upon the surface of the mechanical stop 35. On completion of this movement the chuck 24 closes and holds the glass tube exactly in position.

Tension spring 143 anchored to the lever 128 and to the base 21 of the machine serves to pull the lever against mechanical stop 144, in order to keep the chain 133 in good contact with the spur wheels 130, 131 when the storage magazine 40 is not engaged in its advancing movement. The influence of this spring is overcome by the weight of the clamp assembly when the latter is moving downwards (FIGS. 1, 3).

During the last part of the downward movement of the clamp assembly while the glass tube 41 is being introduced into the chuck 24, the clamping lever 121 is opened by roller 147 acting in conjunction with a stationary limiting stop 145 on the lever 117. The clamp assembly can therefore swing round unimpeded by the glass tube.

Subsequently the clamp assembly is moved upwards over the rising part of the cam 126. In this movement when the roller 147 of the clamping lever 121 reaches its upper end position, it makes contact with the second limiting stop 146, and in this way the clamp assembly is opened to take the next glass tube 41 from the storage magazine 40.

Whereas there has been described above, on the basis of FIGS. 1 to 9, a version of the device according to the invention in which there is a stationary storage magazine for feeding all the chucks, there will now be described on the basis of FIGS. 12 to 16 an arrangement in which there are several magazines 148, one for each chuck 24. In this arrangement there is a magazine supporting ring 150 mounted by means of four distance pieces 149 on the rotary carrier 23. On the magazine support ring 150 there are mounted turret magazines 148, one for each chuck 24. The turret magazines 148 are each mounted rotatably on a pin 151 fixed to ring 150 in such fashion that (FIGS. 13, 15 and 16) in each case one tube guide 152 is situated exactly over the axis of the chuck 24. Each turret magazine 148 has five tube guides 152 for the long glass tubes 41, which are fed in by hand. To the lower rim of the turret magazine 148 there are attached switch pins 153, one for each tube guide 152. Underneath the turret magazine 148 are support plates 154, which support the lower ends of the glass tubes and along which the glass tubes can slide. These slip plates 154 are also mounted on the central pins 151. The slip plates 154 are pierced by drillings 156, which have about the same diameters as the openings in the chucks 24 and are in line with the openings. Between each turret magazine 148 and its slip plate 154 there are leather friction washers 157, to prevent the turret magazine 148 from rotating too freely.

To the sides of the slip plates 154 are attached pawls 158. Each pawl 158 has a notch 159. A tension spring 160 pulls the pawl with its notch 159 against a switch pin 153 of the turret magazine 148, in order to retain the latter in the position described above.

If a turret magazine is in the position A and the chuck 24 contains no glass tube, then when the rotary carrier 23 moves the magazine from the position A to the position B a glass tube 41 is fed from the turret magazine 48 into the chuck 24 in the position B. There is a bearing arm 161 mounted on the upper end of the stand 26, and the end of this bearing arm supports angle lever 163, which is pivoted at 162. To one end of the angle lever 163 there is attached by pivot 164 double-ended lever 165. The other end of the angle lever 163 supports cam roller 166, which is acted on by cam 167. This cam 167 is mounted, together with cam 168, on the upper end of the control shaft 29. Roller 169, which is mounted on the one end of the double-armed lever 165, is acted on by the cam 168. Tension springs 170 and 171 pull the rollers 166 and 169 against the cams 167 and 168. At the other end of the double-armed lever 165 there is surface 172, and attached to this underneath there is a cam plate 173. The combined action of the two cams 167 and 168 causes the double-armed lever to follow the path indicated by the dotted lines 174 in FIG. 16.

The turret magazines 148 are rotated into the next feeding position by the action of the cam plate 173, which pushes against the roller 175 of the pawl 158, pushing the pawl into the position shown in dotted lines in FIG. 15. This first of all releases the pawl and then the surface 172 comes into contact with the switch pin 153 and begins to rotate the turret magazine 148 around into the next feeding position. The pawl 158 is held only for a short time by the cam plate 173 in the position shown in dotted lines, and is then quickly allowed to snap back into its initial position.

At this instant one of the tube guides 152 of the turret magazine 148 is just over the drilling 156 in the slip plate 154. The glass tube 41, no longer supported, falls freely into the empty chuck 24, which in the meantime has been opened by the lever 91. As soon as the glass tube has struck the mechanical stop 35, the chuck closes. At this time the turret magazine 148 has become locked against rotation by the fact that the pawl 158 has snapped into engagement with a switch pin 153. In this way the turret magazine 148 is prevented from rotating beyond the angle required for the next feeding operation. The snapping of the pawl 158 into engagement with the switch pin 153 is facilitated by its sloping surface 176.

I claim:
1. Glass tube feeding device for feeding glass tubes to the working chucks of glass working machines comprising at least one storage magazine including means for storing work pieces therein, means including several work stations to which the work pieces are advanced successively, transfer means for transferring a work piece from said magazine to a chuck, a control shaft including cam means and driver means mounted thereon, follower means coacting with said cam means, means for selectively actuating said magazine with said follower means for successive feeding of each work piece to an empty chuck, drive shaft means having a driving means thereon, a coupling mechanism interconnecting said drive shaft means to said control shaft, lever and brake means selectively operated by said control shaft means to effect the control operation of said transfer means when an empty chuck becomes ready for filling with a glass tube.

2. Glass tube feeding device according to claim 1, wherein said coupling mechanism comprises a control stirrup (52) including a plurality of arms and pivot means therefor to selectively contact said driver means on said control shaft, means when the control shaft means is not coupled to the drive shaft means one arm of said stirrup means supports said movable driver on the control shaft means thereby keeping this driver means out of engagement with the driving means of the drive shaft means, control stirrup pivot means whereas in order to couple together said control shaft means and drive shaft means the control stirrup pivots allowing the driving means of the control shaft to operably engage the drive shaft means.

3. Glass tube feeding device according to claim 2, wherein the driver of the control shaft includes means which pushes the second arm of the stirrup back into the position in which the first arm may act as support for the driver.

4. Glass tube feeding device according to claim 3, wherein the supporting arm of the control stirrup includes a rising cam surface which contacts a roller of the driver of the control shafts.

5. Glass tube feeding device according to claim 2, wherein the stirrup includes means to lock the control stirrup in the supporting position.

6. Glass tube device feeding according to claim 5, wherein the control stirrup includes an extension in the form of an arm capable of initiating a pivoting movement, locking means whereas when the control stirrup is at rest this arm is locked by the nose of a locking lever.

7. Glass tube feeding device according to claim 5, wherein the control stirrup includes means to release the lock just before the beginning of the pivoting movement of the control stirrup.

8. Glass tube feeding device according to claim 7, wherein said control stirrup includes a linkage system which comprises at one end a locking nose and at the other end a guide rail and a cam follower connected to the chuck which engages with the guide rail and initiates the unlocking process when the chuck is empty.

9. Glass tube feeding device according to claim 8, wherein the cam follower includes means which initiates the unlocking of the control stirrup and serves to initiate the movement of the control stirrup which releases the driver of the control shaft.

10. Glass tube feeding device according to claim 2, wherein the control stirrup includes switching means initiated by a guide rail.

11. Glass tube feeding device according to claim 10, wherein said switching means comprises a switch wheel, one guide rail for initiating the movement of the control stirrup and one guide rail for unlocking the control stirrup, said guide rails being juxtaposed to each other, said unlocking rail being longer than the movement-initiating rail so that the actuator first pushes down the unlocking rail and then the movement initiating rail, but releases both the rails and at about the same time.

12. Glass tube feeding device according to claim 2, wherein said driver of the control shaft includes an element pivotably mounted on a block, whereby when the element is released by the supporting arm of the control stirrup it engages with the driver of the driving shaft.

13. Glass tube feeding device according to claim 1, wherein the control shaft includes a cam and an arm spring biased for opening the chuck to allow the introduction of a fresh glass tube from the magazine, said cam actuating the arm which opens the chuck against the influence of a tension spring.

14. Glass tube feeding device according to claim 1, wherein the control shaft comprises a cam, pawl means and switch wheel for advancing the next storage magazine filled with glass tubes to the next filling position, said cam actuating a pawl and a locking pawl, both of which act on said switch wheel in such a way that the storage magazine rotates to bring the next glass tube into the delivery position.

15. Glass tube feeding device according to claim 14, wherein said device comprises a pivotal clamp assembly interconnected by actuating means to said drive shaft wherein the glass tubes are conveyed into the chuck from the magazine by means of the pivotal clamp assembly.

16. Glass tube feding device according to claim 15, wherein said clamp assembly includes a shaft with axially slidable and pivotable mounting means therefor on said shaft extending parallel to the axis of the magazine.

17. Glass tube feeding device according to claim 16, wherein said clamp assembly includes chain and catch means actuated by a lever and cam means on said control shaft wherein the downward movement of the clamp assembly swings clear of the chuck and is then lifted up by said chain and is locked by said lever and catch means in the initial position.

18. Glass tube feeding device according to claim 15, including means wherein said clamp assembly is first pivoted until it is over the chuck, and then after a lock has been released the clamp assembly slides downwards on said actuating means under the influence of gravity, sliding along the said parallel extending shaft and thus introduces the tube into the chuck.

19. Glass tube feeding device according to claim 15, wherein said clamp assembly consists of a first pair of levers and a third clamping lever which tends to thrust in the direction of the said first pair of levers in resilient fashion.

20. Glass tube feeding device according to claim 19, wherein said clamp assembly comprises a plurality of stops wherein said third clamping lever is held open by the stops in the two positions for receiving and for delivering the glass tube.

21. Glass tube feeding device according to claim 1, wherein said device comprises a single storage magazine which is stationary in position.

22. Glass tube feeding device according to claim 1, wherein the device comprises one storage magazine for each working chuck.

23. Glass tube feeding device according to claim 22, wherein the cam actuated lever includes means for actuating the pawl for the storage magazine and releases the locking pawl and actuates the advancing movement of the magazine.

24. Glass tube feeding device according to claim 1, wherein the control shaft includes a mechanical stop and a cam which moves into the working position the mechanical stop which catches the tube as it falls into the chuck and retains it in the correct position.

25. Glass tube feeding device according to claim 24, wherein the mechanical stop includes a lever system comprising a friction brake.

26. Glass tube feeding device according to claim 1, wherein the control shaft includes bearing means supported in a stand attached to the base of the machine.

27. Glass tube feeding device according to claim 26, wherein the stand comprises supporting bearing means for the storage magazine.

28. Glass tube feeding device according to claim 1, wherein the control shaft includes a friction brake.

References Cited

UNITED STATES PATENTS

| | | | |
|---|---|---|---|
| 1,356,174 | 10/1920 | Soubier | 198—22 X |
| 2,486,085 | 10/1949 | Whitmore et al. | 198—24 X |
| 2,691,246 | 10/1954 | Roeber. | |
| 2,860,760 | 11/1958 | Yeo et al. | 198—24 |
| 2,878,620 | 3/1959 | Calehuff et al. | 198—209 X |
| 2,906,580 | 9/1959 | Terry et al. | 198—20 X |

EVON C. BLUNK, *Primary Examiner.*

HUGO O. SCHULZ, *Examiner.*

M. L. AJEMAN, *Assistant Examiner.*